US009600161B2

(12) United States Patent
Hasegawa et al.

(10) Patent No.: US 9,600,161 B2
(45) Date of Patent: Mar. 21, 2017

(54) GENERATING AND DISPLAYING A SPECIFIC AREA

(71) Applicant: INTERNATIONAL BUSINESS MACHINES CORPORATION, Armonk, NY (US)

(72) Inventors: Mihoko Hasegawa, Tokyo (JP); Keiji Miura, Yamato (JP); Masato Noguchi, Sagamihara (JP); Lianzi Wen, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/594,592

(22) Filed: Jan. 12, 2015

(65) Prior Publication Data
US 2015/0199820 A1  Jul. 16, 2015

(30) Foreign Application Priority Data
Jan. 14, 2014  (JP) ................... 2014-003995

(51) Int. Cl.
*G06T 7/00*  (2006.01)
*G06F 3/0484*  (2013.01)
*G06F 3/0481*  (2013.01)
*G06F 3/0482*  (2013.01)

(52) U.S. Cl.
CPC ........ *G06F 3/04845* (2013.01); *G06F 3/0481* (2013.01); *G06F 3/0482* (2013.01); *G06F 2203/04803* (2013.01)

(58) Field of Classification Search
None
See application file for complete search history.

(56) References Cited

U.S. PATENT DOCUMENTS

| | | | | |
|---|---|---|---|---|
| 8,635,518 | B1* | 1/2014 | Bhanoo | G06F 17/2247 715/205 |
| 8,850,351 | B2* | 9/2014 | Beharie | G06F 3/0481 715/778 |
| 9,317,226 | B2* | 4/2016 | Aoki | G06F 3/1204 |
| 2008/0168388 | A1* | 7/2008 | Decker | G06F 3/0481 715/800 |
| 2010/0042933 | A1* | 2/2010 | Ragusa | G06F 3/0481 715/760 |

(Continued)

FOREIGN PATENT DOCUMENTS

| | | |
|---|---|---|
| JP | 05-307458 | 11/1993 |
| JP | 09-090925 | 4/1997 |

(Continued)

*Primary Examiner* — Kimberly A Williams
(74) *Attorney, Agent, or Firm* — Law Office of Jim Boice

(57) ABSTRACT

A method displays a copy of a specified display area on a computer display. A first signal is received from a user. The first signal specifies a display area on a display as a specified display area. The specified display area presents a dynamic activity being performed on a computer. A second signal is received from the user to identify a particular object in the specified display area. A copy of the specified display area, which includes only the particular object, is generated. The copy of the specified display area has a same shape as the specified display area, presents the dynamic activity being performed on the computer, and is displayed on the display.

17 Claims, 15 Drawing Sheets

(56) References Cited

U.S. PATENT DOCUMENTS

| | | | | |
|---|---|---|---|---|
| 2010/0115430 A1* | 5/2010 | Skirpa | ................. | G06F 17/2247 715/760 |
| 2012/0099153 A1* | 4/2012 | Aoki | ..................... | G06F 3/1204 358/1.15 |
| 2014/0068505 A1* | 3/2014 | Hayes | .................. | G06F 9/4443 715/800 |
| 2014/0325400 A1* | 10/2014 | Zhao | .................... | G06F 3/0482 715/760 |
| 2016/0077677 A1* | 3/2016 | Valdes | ............. | G06F 17/30849 715/719 |
| 2016/0103569 A1* | 4/2016 | Zatalovski | ............ | G06F 3/0482 715/738 |

FOREIGN PATENT DOCUMENTS

| | | |
|---|---|---|
| JP | 10-069365 | 3/1998 |
| JP | 11-161474 | 6/1999 |
| JP | 2000-330684 | 11/2000 |
| JP | 2002-023843 | 1/2002 |
| JP | 2006-107079 | 4/2006 |
| JP | 2007157039 A | 6/2007 |
| JP | 2007-328444 | 12/2007 |
| JP | 2008305138 A | 12/2008 |
| JP | 2009-093510 | 4/2009 |
| JP | 2012230553 A | 11/2012 |
| JP | 2013-092908 A | 5/2013 |
| JP | 2013109432 A | 6/2013 |

\* cited by examiner

GENERATING AND DISPLAYING A SPECIFIC AREA

BACKGROUND

The present invention relates to a display method of a specific area, and more particularly, to a method, a device, and a computer program for generating a specific area from a display area including information to be focused on, and displaying the same.

In recent years, an integrated development environment is becoming widespread, and a style of displaying a plurality of windows on a display and allowing one to perform development while referring to necessary information is becoming the norm. In addition, activation of a plurality of browsers is also being performed. In such an environment where a plurality of windows are present in a mixed manner, there is a demand for being able to work while looking at a window including key information.

Known prior art describes a client terminal monitoring system. It is disclosed that a screen of a list of monitoring targets is displayed at an administrator terminal, and that, in the case the window of the screen of the list and the work window of the administrator overlap each other, the monitoring level for a monitoring target hidden by the work window is determined. However, a technique for displaying the window including necessary information, for the monitoring targets, at an appropriate position and with an appropriate size is not provided.

SUMMARY

In an embodiment of the present invention, a method and/or computer program product displays a copy of a specified display area on a computer display. A first signal is received from a user. The first signal specifies a display area on a display as a specified display area. The specified display area presents a dynamic activity being performed on a computer. A second signal is received from the user to identify a particular object in the specified display area. A copy of the specified display area, which includes only the particular object, is generated. The copy of the specified display area has a same shape as the specified display area, presents the dynamic activity being performed on the computer, and is displayed on the display.

In an embodiment of the present invention, a device for displaying a copy of a specified display area on a computer display comprises an input receiving device, a display generating logic, and a display. The input receiving device receives a first signal from a user. The first signal from the user specifies a display area on a display as a specified display area, which presents a dynamic activity being performed on a computer. The input receiving device also receives a second signal from the user identifying a particular object in the specified display area. The display generating logic generates a copy of the specified display area that includes only the particular object, has a same shape as the specified display area, and presents the dynamic activity being performed on the computer. The display displays the copy of the specified display area.

DETAILED DESCRIPTION

Figure 1:
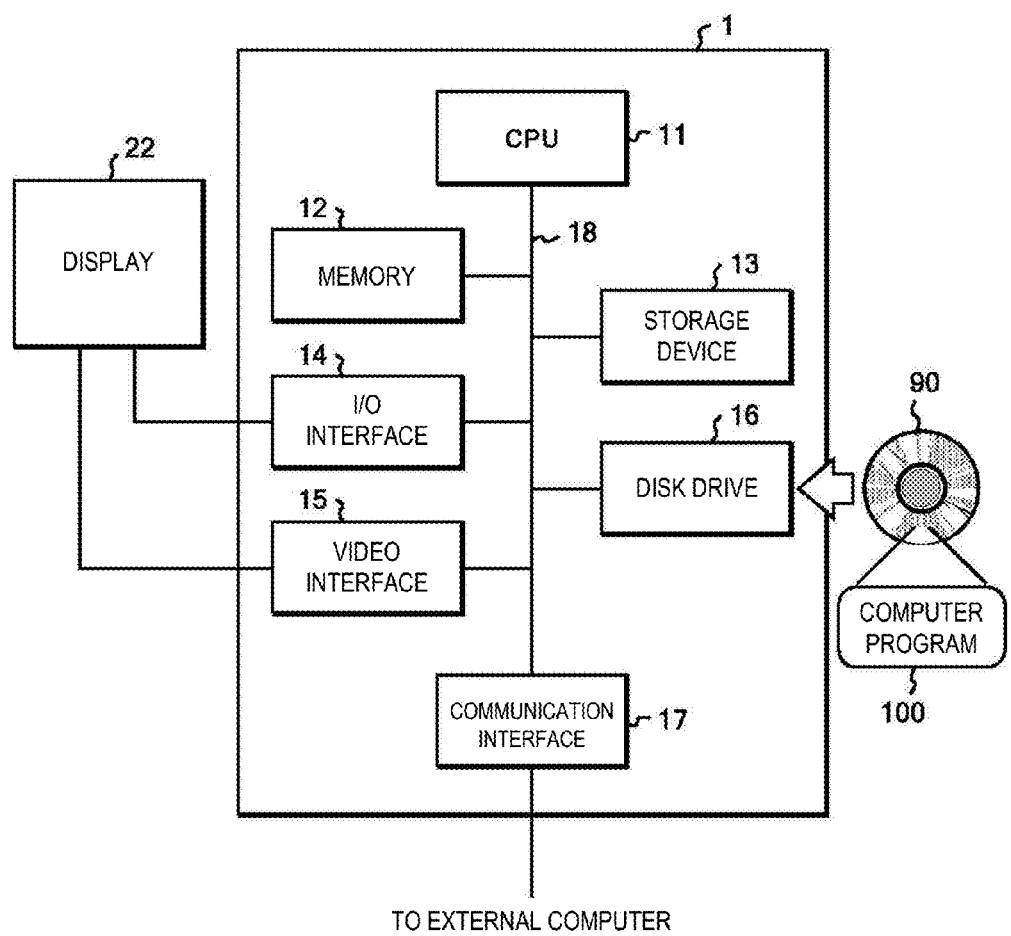
FIG. 1 is a block diagram showing a configuration of an information processing apparatus of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a block diagram showing a configuration of an information processing apparatus according to an embodiment 1 of the present invention. An information processing apparatus 1 according to an embodiment 1 of the present invention is configured at least by a CPU (Central Processing Unit) 11, a memory 12, a storage device 13, an I/O interface 14, a video interface 15, a disk drive 16, a communication interface 17, and an internal bus 18 for connecting the pieces of hardware mentioned above.

The CPU 11 is connected to each of the above-described hardware units of the information processing apparatus 1 via the internal bus 18, and controls the operation of each of the above-described hardware units, and also, executes various software functions according to a computer program 100 stored in the storage device 13. A load module is loaded into the memory 12 at the time of execution of the computer program 100, and temporary data generated at the time of execution of the computer program 100 is stored therein.

The storage device 13 is a built-in stationary storage device, and is configured by a ROM or the like. The computer program 100 stored in the storage device 13 is downloaded by the portable disk drive 16 from a portable recording medium 90 such a as a DVD or a CD-ROM recording information such as a program and data, and is loaded, at the time of execution, into the memory 12 from the storage device 13 to be executed. A computer program downloaded from an external computer connected via the communication interface 17 may, of course, be used instead.

The communication interface 17 is connected to the internal bus 18, and is capable of exchanging data with an external computer and the like by being connected to an external network such as the Internet, a LAN, a WAN or the like.

The I/O interface 14 receives input of data from outside. For example, in the case a display 22 is provided with a touch panel, signals are received from the touch panel via the I/O interface 14. Also, the video interface 15 is connected to the display 22. The display 22 displays a window generated by a method unique to the present invention.

Figure 2:
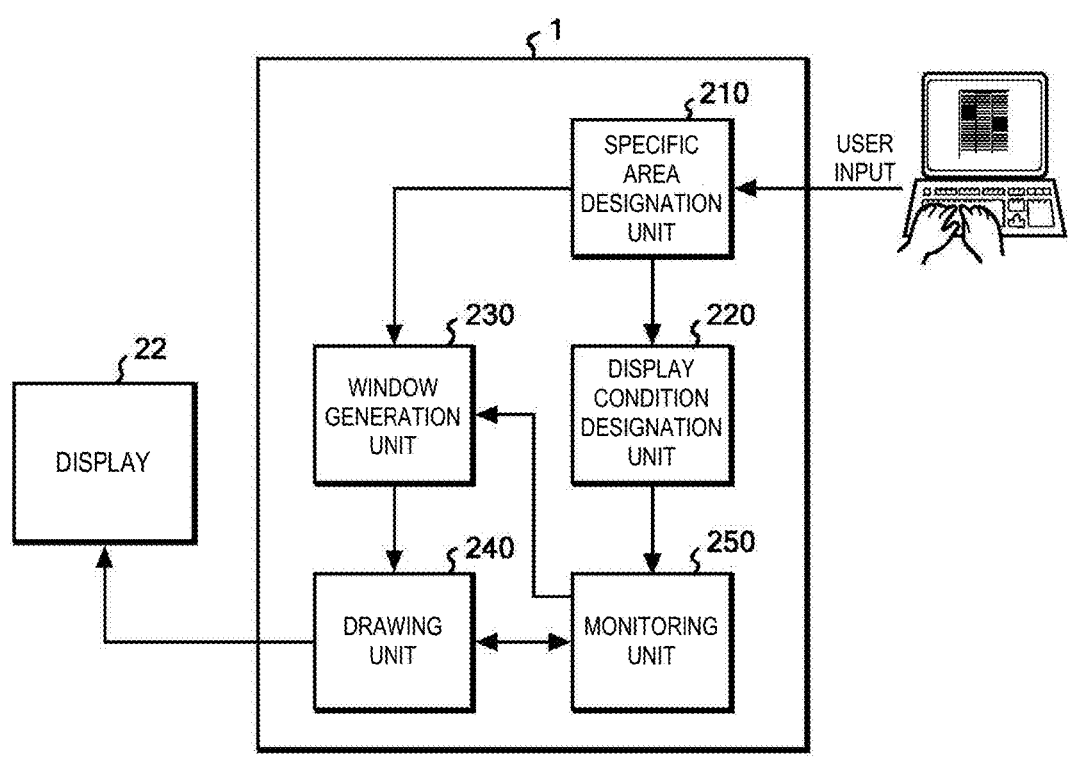
FIG. 2 is a functional block diagram of the present invention.

FIG. 2 shows a functional block diagram of the present invention. First, a specific area designation unit 210 sets a specific area desired to be monitored, according to an input from a user. A specific area may be a part of an arbitrary object, or an area including parts of a plurality of objects. In the following description, a window is cited as an example of the object. The same operation is also possible for icons and the like whose display state may change.

A display condition designation unit 220 designates, as an option at the time of setting a specific area, a condition of generating a window only when there is a change in a designated specific area. For example, a case where a character string is displayed in the specific area, a case where a message has arrived from the system with respect to a window included in the specific area, a case where there is a change in an image in the specific area, or the like is designated as the condition.

A monitoring unit 250 determines whether or not the condition designated by the display condition designation unit 220 is satisfied. For example, whether a character string is displayed in the specific area, whether a message has arrived from the system with respect to a window included in the specific area, or whether a change has been made in an image in the specific area is monitored, and when the condition is satisfied, a window generation unit 230 is instructed to generate a predetermined window.

The window generation unit 230 generates an area designated by the specific area designation unit 210 into a new window. At this time, in the case a condition is set by the display condition designation unit, the window is not instantly generated. In this case, the window is generated according to an instruction regarding generation of a predetermined window from the monitoring unit 250.

A drawing unit 240 draws a window generated by the window generation unit 230 on the display 22.

Figure 14:
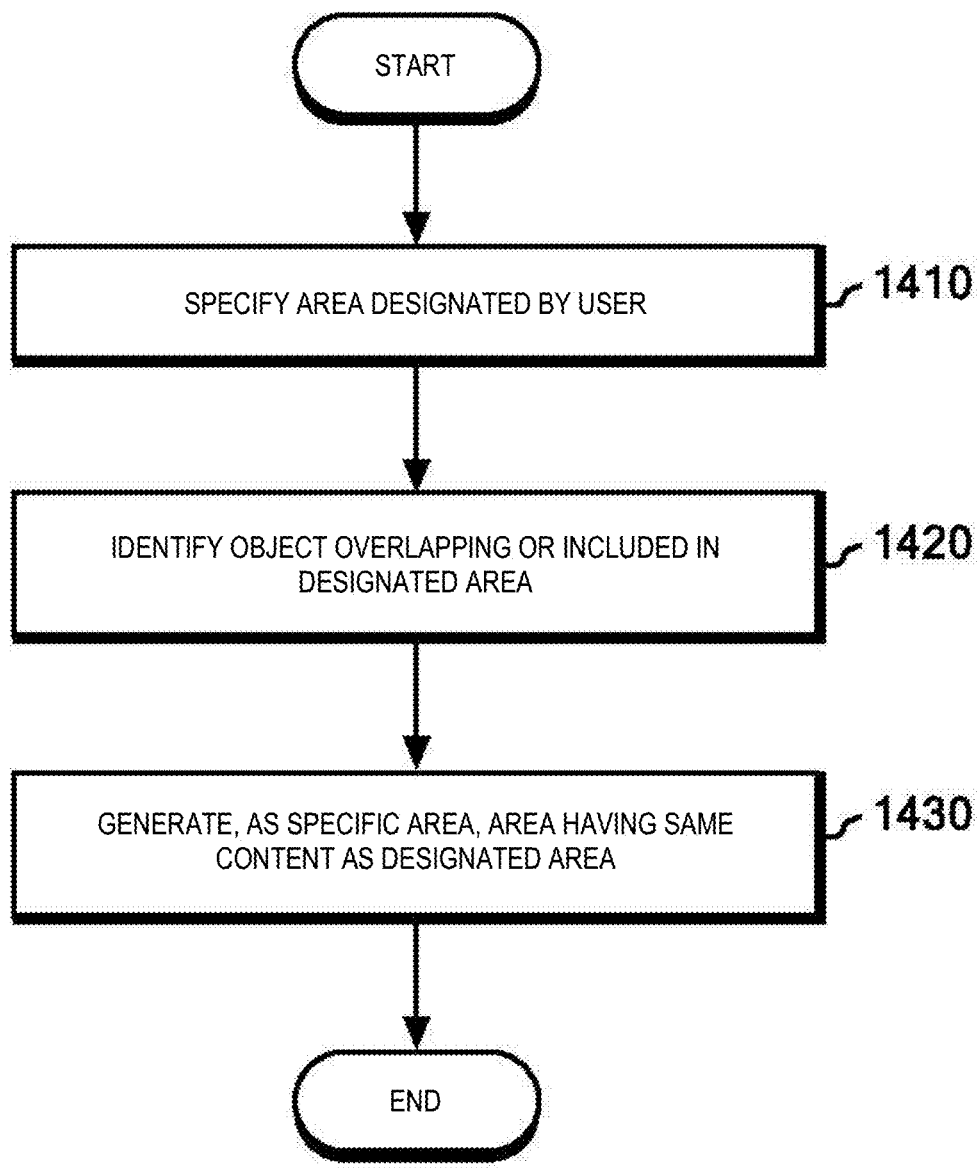
FIG. 14 is a flow chart of processing of the present invention.

A flow chart of processing of the present invention is shown in FIG. 14. First, a display area designated by a user is specified in step 1410. Next, in step 1420, an object that overlaps or that is included in the specified area is identified. Then, in step 1430, an area having the same information, the same size and the same shape as the specified area and including the object that is displayed in the specified area is generated as a specific area.

Figure 3:
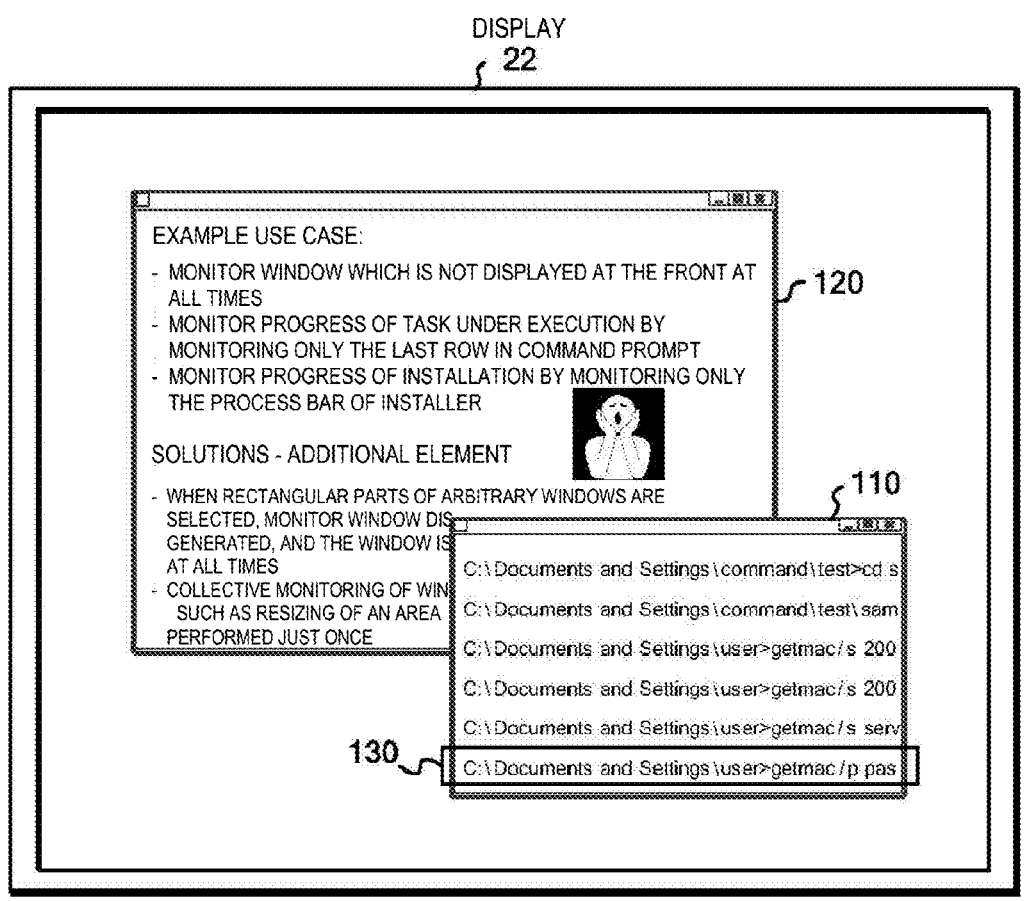
FIG. 3 is a generation process of a window of the present invention.
Figure 4:
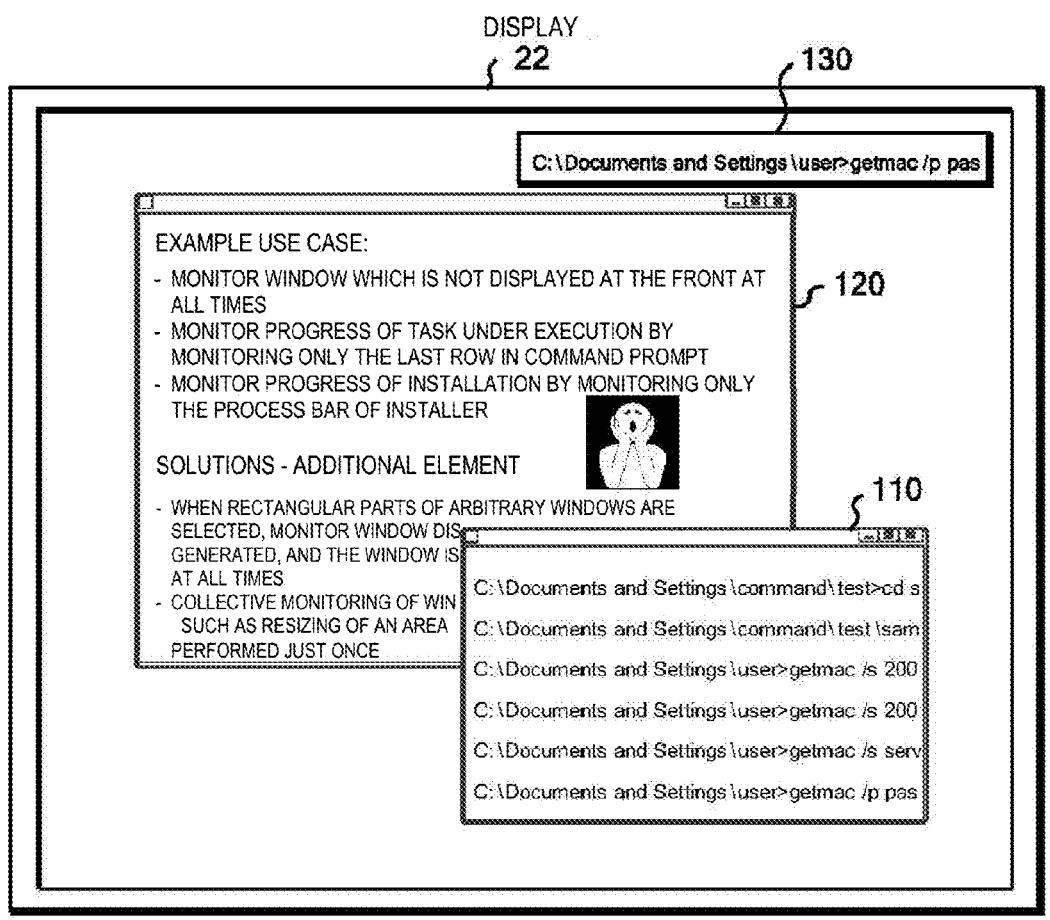
FIG. 4 is a generation process of a window of the present invention.
Figure 5:
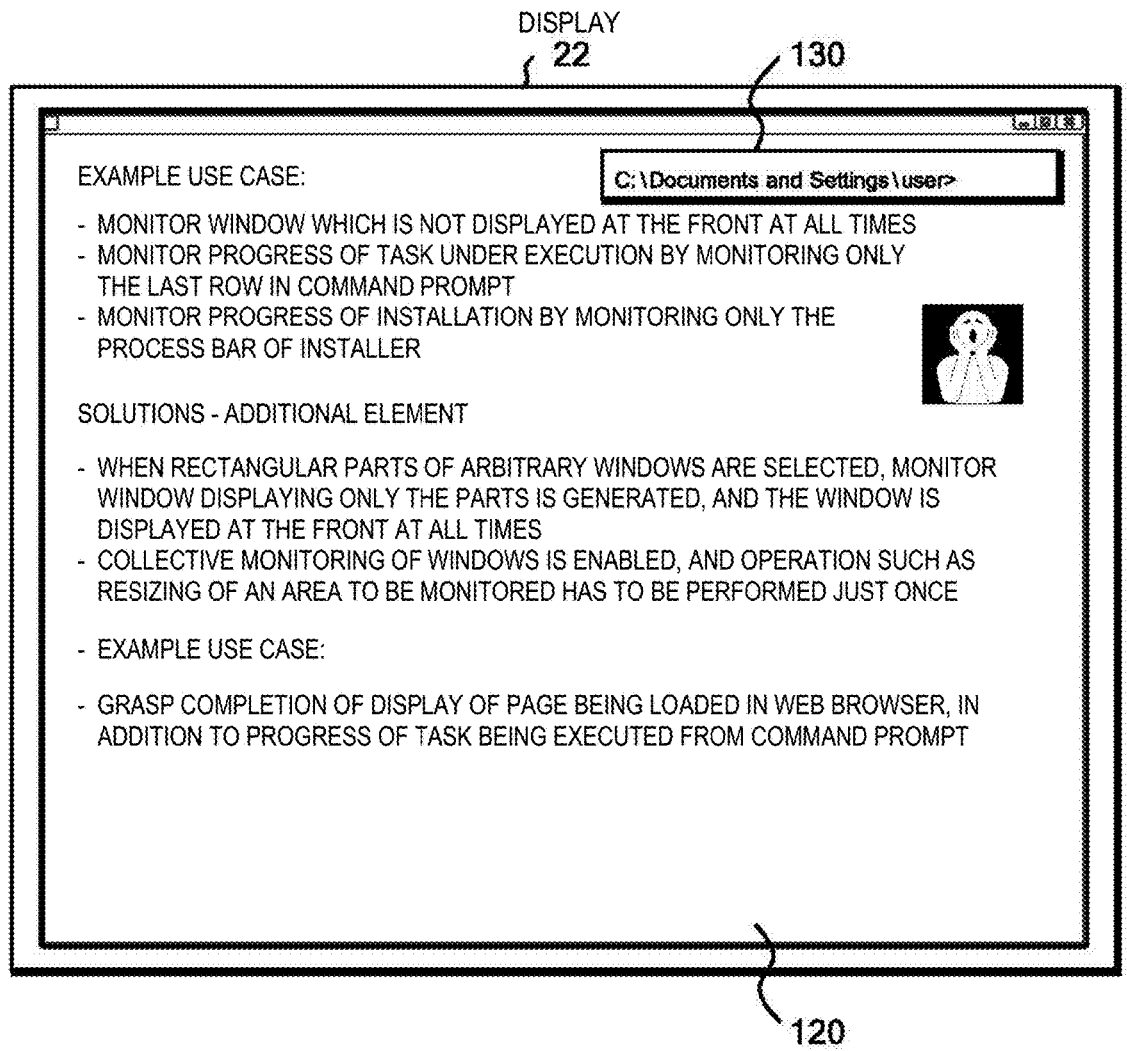
FIG. 5 is a generation process of a window of the present invention.

FIGS. 3 to 5 show processes of generation of a window that is unique to the present invention. First, in one embodiment it is assumed that a user is operating a business application 120 while referring to information in a window 110 including important information.

For example, it is assumed that the user is a programmer, a compiling process of a program is sequentially displayed in the window 110, and pieces of information being compiled (batch processing) are displayed in the window 110 while being scrolled.

In this case, the part where the user is interested in is a lowermost row 130 in the window 110, and the rest of the information is unnecessary. Thus, the user starts a specific area designation program of the present invention, and sets a specific area by a pointing device such as a mouse.

A specific area 130 that is set is generated by the window generation unit 230 as a new window 130, and is capable of being moved to any position on the display 22 and of being displayed with any size. The generated window 130 is displayed at the front, that is, at the uppermost part in a Z direction, at any time.

FIG. 4 shows an example of movement of the window 130. In FIG. 4, the window 130 having the specific area as a display content is displayed on the top right of the screen. In this state, the window 110 may be hidden by another window or may be minimized.

The content of the window 130 is always in accordance with, and displays, the content of the specific area in the window 110 regardless of movement or minimization of the window 110.

It is also possible to generate the specific area as a window object, and to enable movement of the window 130 to an appropriate position in response to an instruction from the user and to enable appropriate resizing without causing the display content to change.

FIG. 5 shows an example display of the window 130. In FIG. 5, although the window 110 is hidden by another window and cannot be seen, it is apparent from the display content of the window 130 that the batch processing that was being performed in the window 110 is complete.

Figure 6:
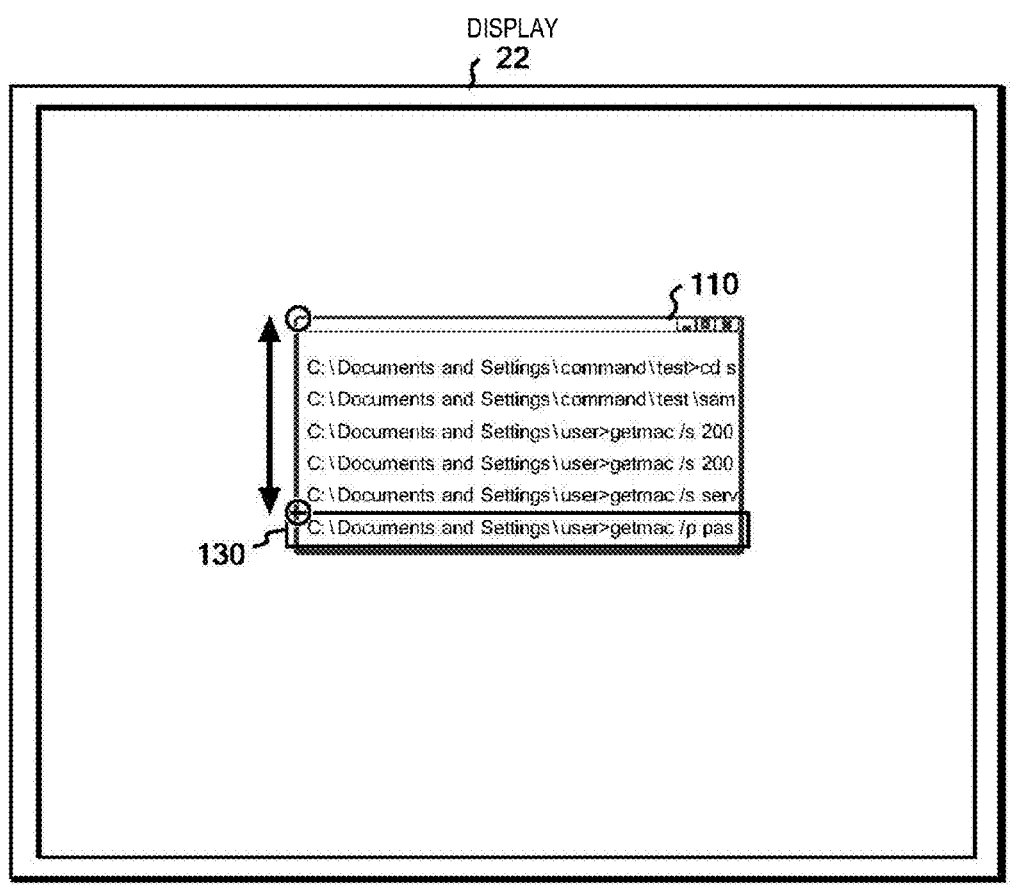
FIG. 6 is a diagram showing a method for setting a specific area.

FIG. 6 shows a method for setting a specific area. When the user presses a predetermined key (for example, the Ctrl key+right button of the mouse), a specific area setting mode is achieved.

Figure 15:
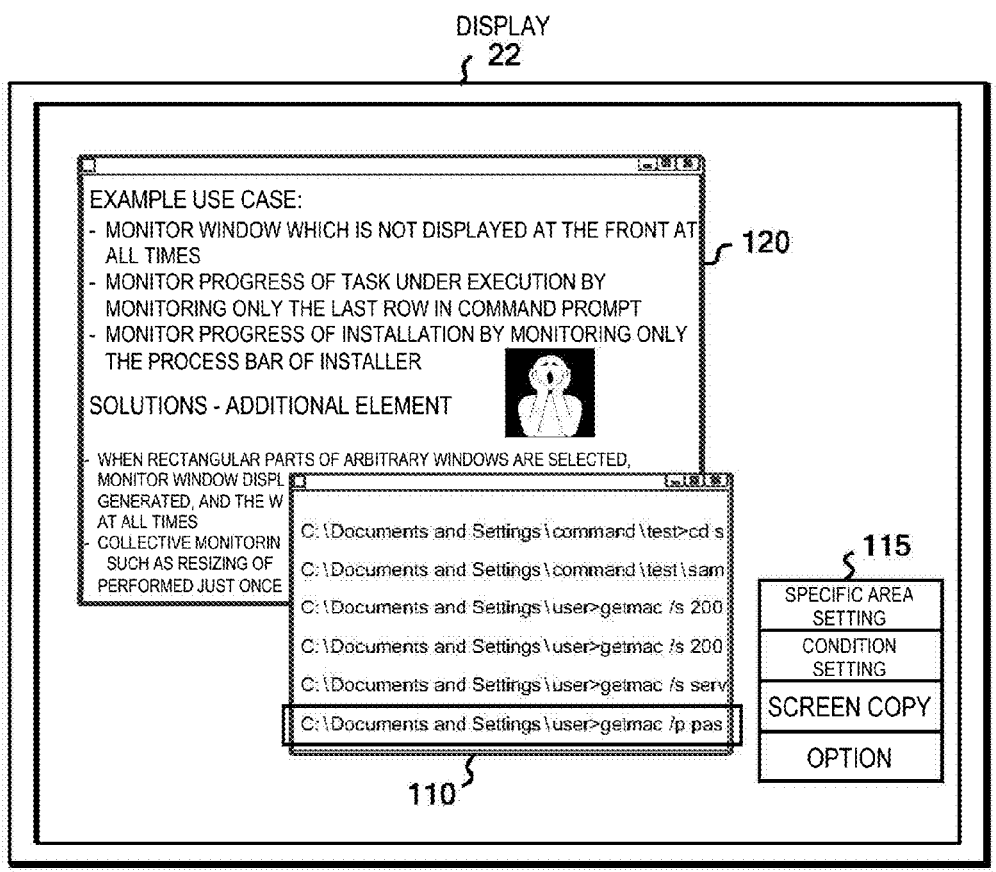
FIG. 15 is a specific area setting panel.

FIG. 15 shows a specific area setting panel. A specific area setting panel 115 includes specific area setting, condition setting, screen copy, and option. In the setting of a specific area, the user sets the specific area using a pointing device such as a mouse.

In the condition setting, a condition for window generation is input. The screen copy is for obtaining a copy of the current specific area, and in the case text comparison or image comparison is necessary according to the condition setting, the copy is saved in a file as a comparison target. Configuration of a calling key is possible with respect to the option, for example.

In the case a specific area is a rectangular area, relative position information is recorded as an origin at the top left of the window 110. In the case a specific area is formed from parts of a plurality of windows, the relative position information is recorded for each of the plurality of windows. These pieces of information are recorded as data shown in FIG. 12.

Figure 7:
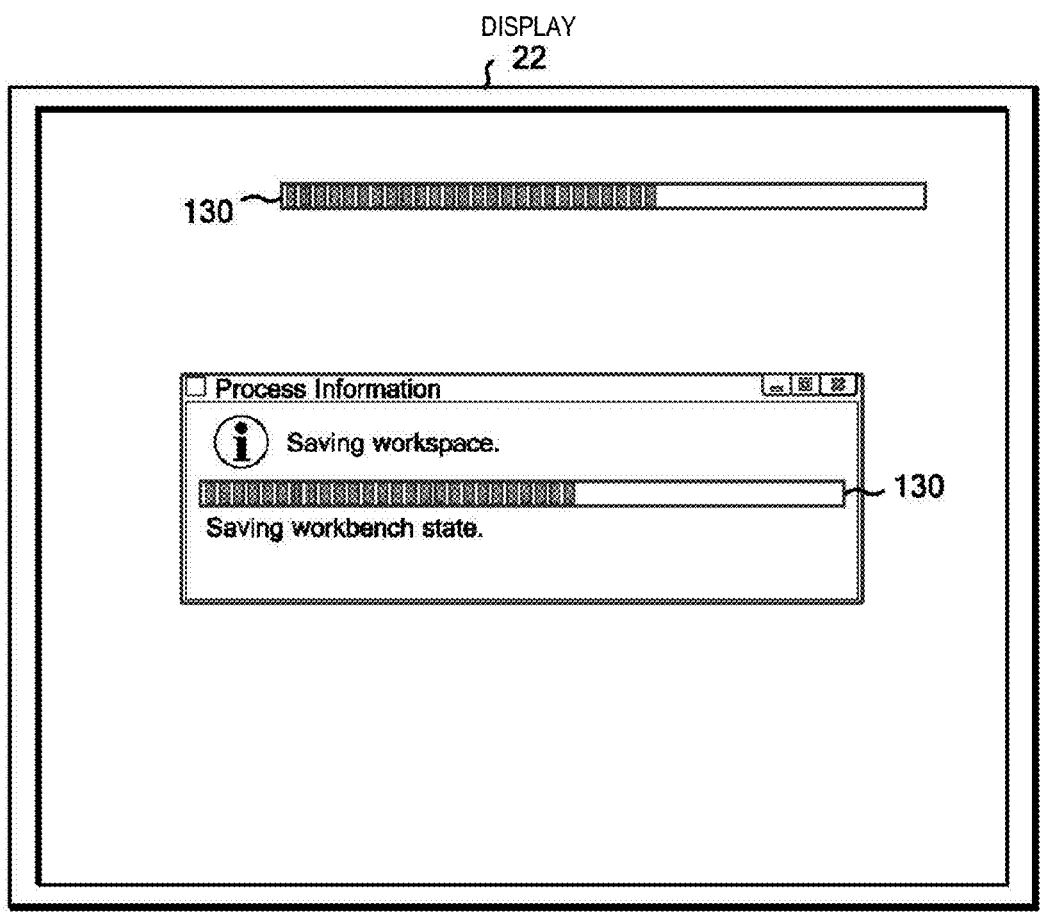
FIG. 7 is a diagram showing an example application of the present invention.

FIG. 7 shows an example of application of the present invention to a status dialog. Generally, application processing, download status, time lapse display and the like are displayed as a status dialog in many cases. In such a case, the window 130 may be generated by designating only the progress bar in the status dialog as a specific area, and be placed at a desired position in the display.

It is also possible to generate the specific area as a window object, and to enable movement thereof to an appropriate position in response to an instruction from the user and to enable appropriate resizing without causing the displayed information to change.

Figure 8:
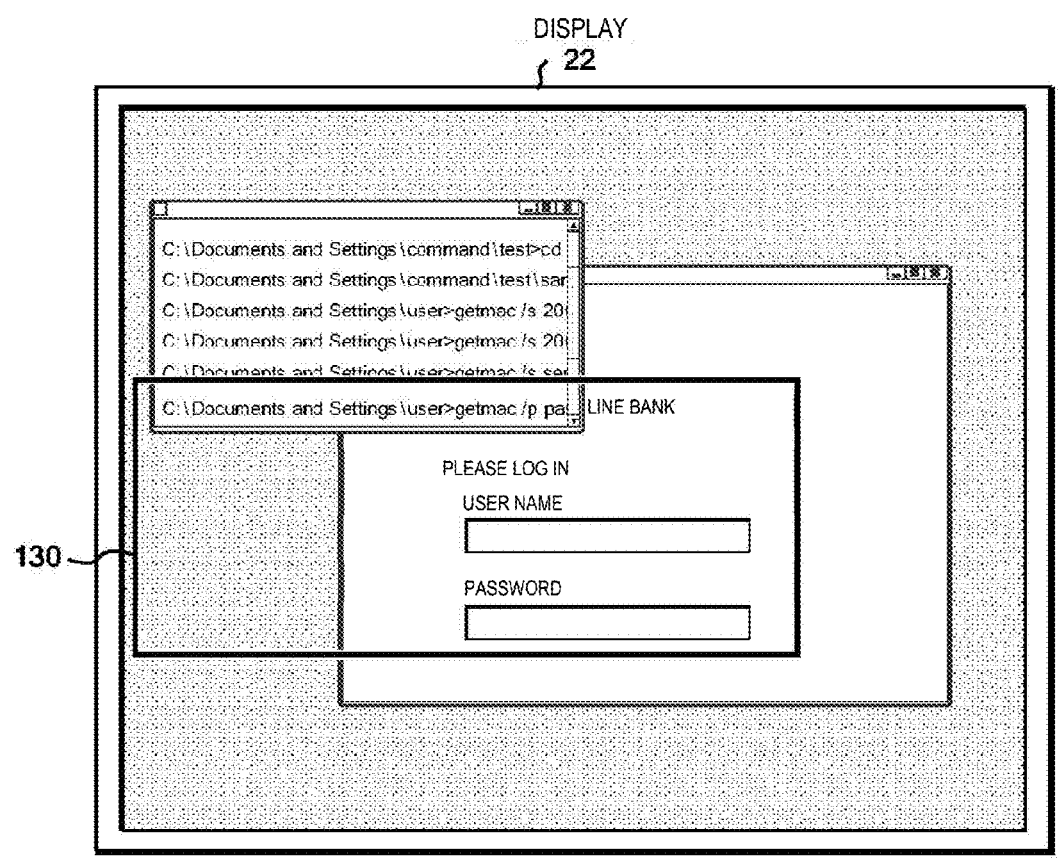
FIG. 8 is a particularly advantageous example of the present invention.

FIG. 8 shows an advantageous example of the present invention. In FIG. 8, an area including two windows and a background is designated as a specific area. More specifically, the window 130, which is a specific area, is generated from the lowermost row of one window, input fields of another window, and a background portion where no object is displayed.

Figure 9:
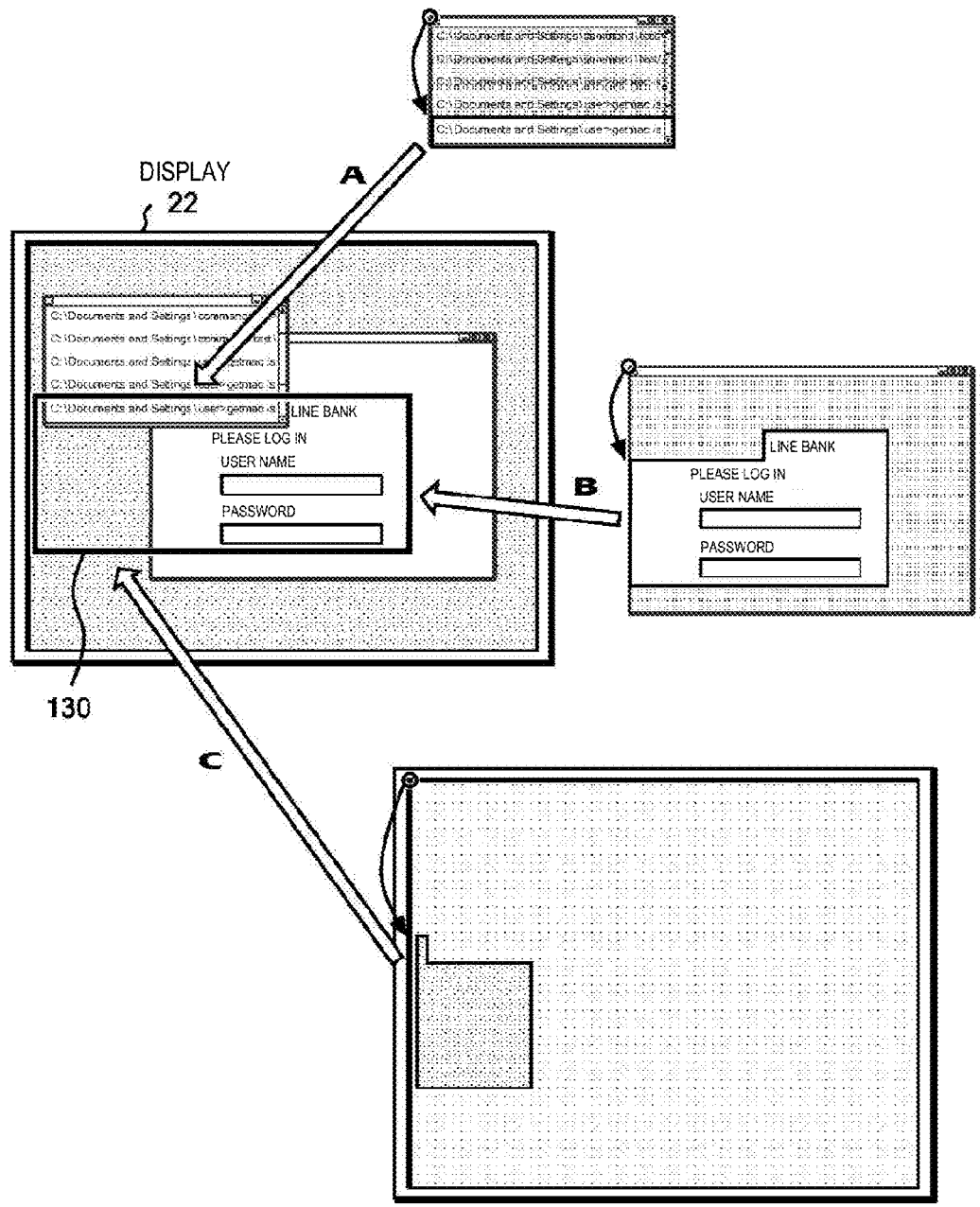
FIG. 9 is a diagram showing a detailed specific area.

FIG. 9 shows a detailed specific area. The specific area is an area combining an area A, an area B, and an area C. This specific area is generated as the window 130. Each area is defined based on relative position information having the top left of the original window as the origin. Accordingly, even if each window moves after setting of the specific area, the content of the window 130 is always in accordance with, and displays, the content of the designated area in each window.

Figure 10:
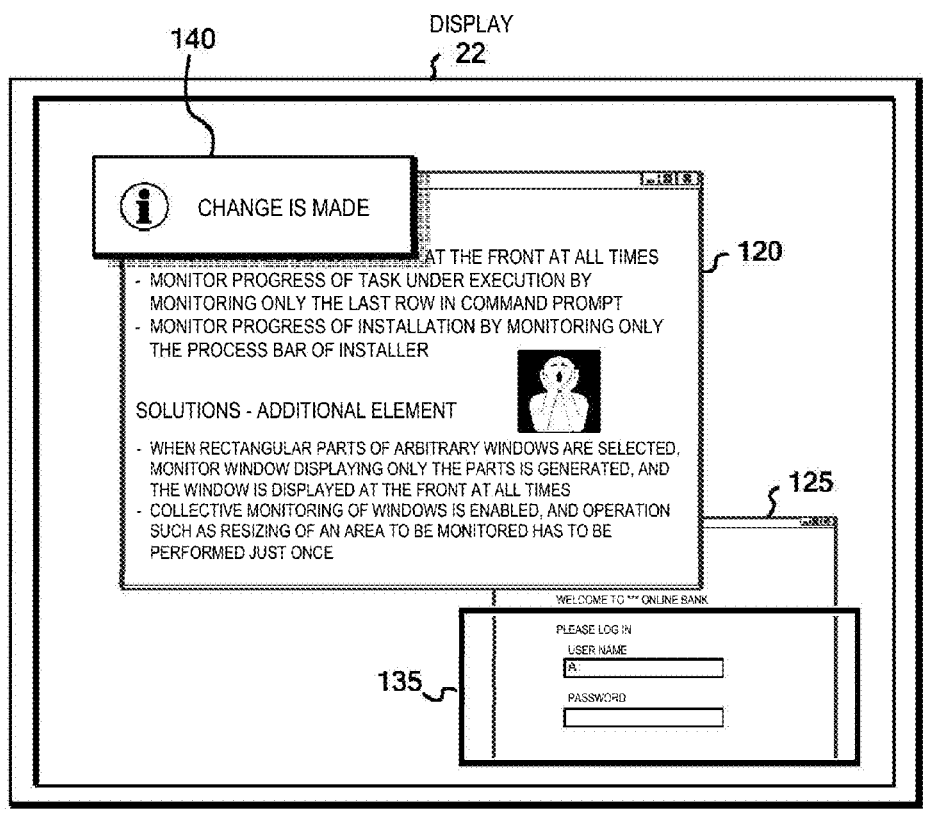
FIG. 10 is a diagram showing an example where a display condition is designated.

FIG. 10 shows an example where a display condition is designated. When there is a change in the content of a specific area 135 at the display condition designation unit 220, a window 140 for notifying a user of the change is displayed.

Figure 12:
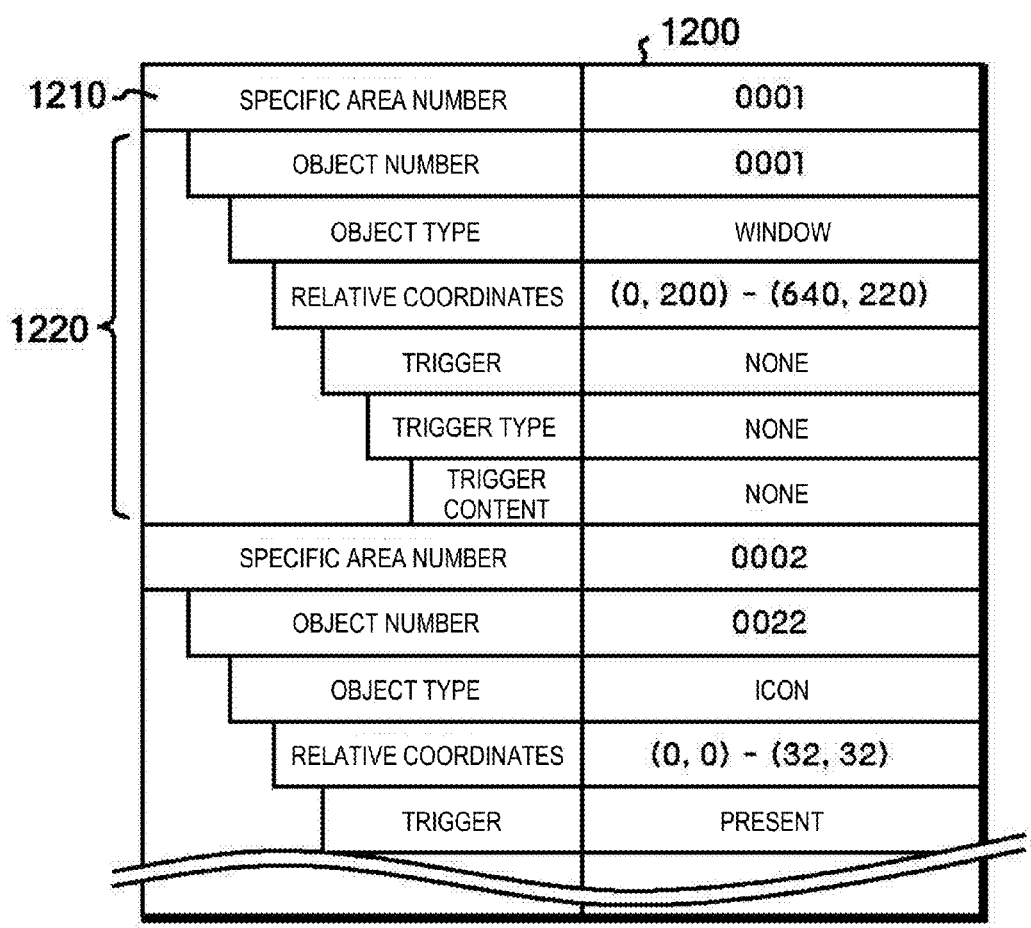
FIG. 12 is an example of a format of data to be recorded.

The window 140 displays a predetermined dialog panel by referring to the type of a trigger and the content of the trigger recorded in data 1200 in FIG. 12. Alternatively, a dialog panel that is different depending on the level of change in the content of the specific area may be displayed. Moreover, as an example modification, the content of the specific area itself may be displayed.

Figure 11:
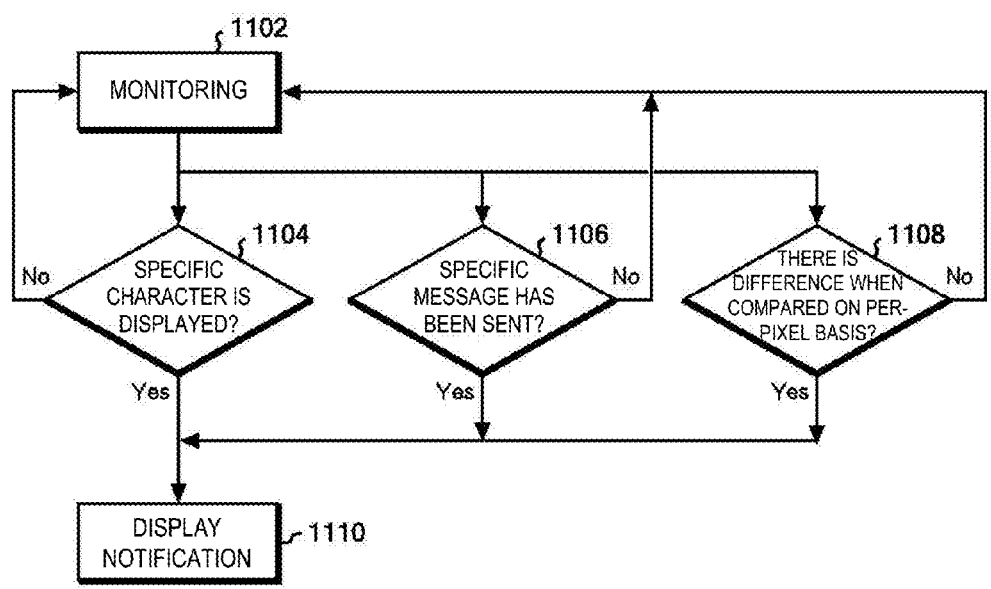
FIG. 11 is a flow chart of processing where a display condition is designated.

FIG. 11 is a flow chart of processing where a display condition is designated. The processing is event-driven. First, in step 1102, a specific area is monitored. Here, whether a specific character is displayed, whether a specific message is sent to the window, and whether a difference is caused in an image on a per-pixel basis are monitored in step 1104, step 1106, and step 1108, respectively, and if any of such conditions is satisfied, the window generation unit 230 is instructed in step 1110 to generate a window for displaying a notification.

FIG. 12 shows data 1200 that is used for window generation. This data 1200 is recorded in the storage device 13 by the specific area designation unit 210 or the display condition designation unit 220, and is referred to by the monitoring unit 250 and the window generation unit 230.

FIG. 12 shows an example of a format of the data to be recorded. In FIG. 12, the data 1200 is managed and recorded by a number for each specific area. As shown in the drawing, each specific area includes a specific area number 1210, a number of an object included in the specific area, the type of the object, relative coordinates used for display, a trigger indicating presence/absence of a condition, the type of the trigger, and the content of the trigger. In the case a plurality of objects are included in the specific area, data fields 1220 of the number of the objects are recorded.

The trigger field records presence/absence of a display condition. In the case a trigger is present, a type such as text change, image change or a window message is recorded as the type of the trigger. In the content of the trigger, a link (folder information, file information) to a target content for a case where comparison of texts or images is necessary is recorded.

In the example of FIG. 12, a specific area number 0001 includes one object, which is a window, and information of a rectangular area is recorded as relative coordinates from the origin of the window. Recording may be performed in the same manner also when the object is an icon, for example.

Additionally, the present invention is not limited to the example described above, and various changes and improvements may be made within the scope of the present invention.

For example, the shape of the specific area does not have to be a rectangle. It should be noted that by having designation of a free area as free area setting, designation of a circular shape, an oval shape, or a curved area by spline for the specific area is enabled.

Figure 13:
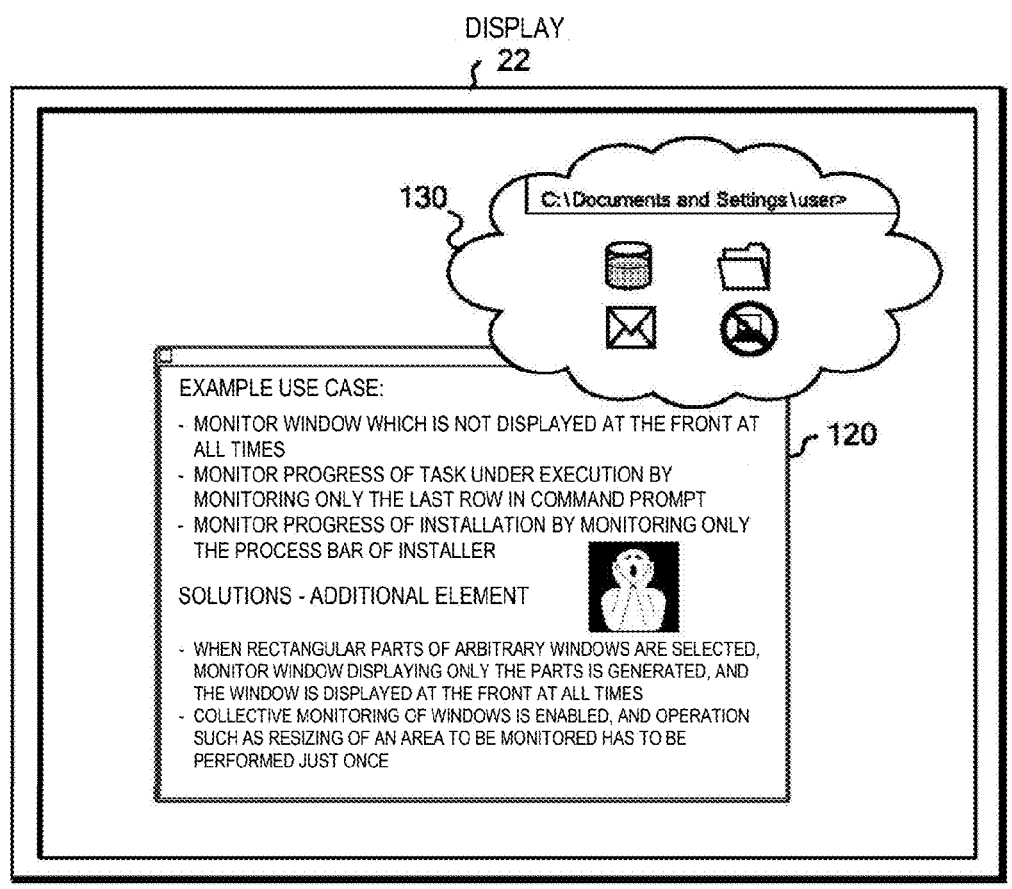
FIG. 13 is an example where a specific area is a curved area.

FIG. 13 shows an example of designation of a free area. In FIG. 13, pieces of information of a part of the compilation status, a remaining hard disk space icon, a folder icon, an email reception icon, and a communication status icon are collectively displayed as objects in a specific area 130 of a cloud-shaped window.

The present invention has been made in view of the circumstance, and has its objective to provide a method, a program, and a device for designating an area desired to be monitored, and generating and displaying the area as a specific area.

Another objective is to provide a method for always displaying at the front, in a separate window, an area designated by a user, as a specific area.

Still another objective is to provide a method for displaying an overlapping portion of a plurality of windows as a specific area, in a separate window and at an appropriate position.

Still another objective is to provide a method for generating a separate window as a specific area, when there is a state change in a designated area, and displaying the information.

The present invention for solving the above problems provides a method for displaying a specific area by processing of a computer, the method including the steps of specifying a display area designated by a user, generating a specific area formed of the specified display area, wherein an object overlapping or included in the specified display area is identified, and an area having same information and a same shape as the specified display area and including the object displayed in the specified display area is newly generated as the specific area, and displaying the specific area.

Also, the step of displaying the specific area after moving and appropriately resizing the specific area in response to an instruction from a user is included.

Here, the object is a window or an icon.

Also, the object includes a plurality of objects, and a specific area including the plurality of objects is generated.

Here, the specific area is a rectangular area or a free-shape area.

Furthermore, the generating further includes the step of setting a condition for display of the specific area in response to an instruction from a user, and the displaying displays the specific area when the condition is satisfied.

Here, the condition is a change in a character, a change in an image, or transmission of a message to an object, in the specified display area.

Also, a predetermined dialog panel is displayed when the condition is satisfied.

As another mode, a computer program for causing a computer to perform each step of the method described above is provided.

As another mode, a recording medium recording the computer program described above in a computer-readable recording medium is provided.

As another mode, a device configuring each step of the method described above as means by computer hardware is provided.

By using the present invention, an area designated by a user may be generated and displayed in a separated window, as a specific window. Also, in the case there is a change in the designated area, a window for appropriately notifying the user of the change may be generated and displayed.

As a first mode for solving the above problem, there is provided a device for displaying a specific area by processing of a computer, the device including the steps of specifying a display area designated by a user, generating a specific area formed of the specified display area, wherein an object overlapping or included in the specified display area is identified, and an area having same information and a same shape as the specified display area and including the object displayed in the specified display area is newly generated as the specific area, and displaying the specific area.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for displaying a copy of a specified display area on a computer display, the method comprising:
  receiving, by one or more processors, a first signal from a user, wherein the first signal specifies a display area on a display as a specified display area, and wherein the specified display area presents a dynamic activity being performed on a computer;
  receiving, by one or more processors, a second signal from the user that identifies a particular object in the specified display area;
  generating, by one or more processors, a copy of the specified display area that includes only the particular object, wherein the copy of the specified display area has a same shape as the specified display area, wherein the copy of the specified display area presents the dynamic activity being performed on the computer, and wherein the copy of the specified display area that includes only the particular object is visible on the display while the specified display area is obscured on the display;
  setting, by one or more processors, a condition for display of the copy of the specified display area in response to an instruction from a user, wherein the copy of the specified display area on the display is displayed in response to the condition being satisfied, wherein the condition is from a group consisting of a change in a character in the specified display area, a change in an image in the specified display area, and a transmission of a message to an object in the specified display area; and
  displaying, by one or more processors, the copy of the specified display area on the display.

2. The method according to claim 1, further comprising:
  receiving, by one or more processors, an instruction from the user to move and resize the copy of the specified display area; and
  in response to receiving the instruction from the user to move and resize the copy of the specified display are, moving and resizing, by one or more processors, the copy of the specified display area on the display.

3. The method according to claim 1, wherein the particular object is a window.

4. The method according to claim 1, wherein the particular object is an icon.

5. The method according to claim 1, wherein the second signal identifying the particular object identifies a plurality of objects.

6. The method according to claim 1, wherein the specified display area is a rectangular area.

7. The method according to claim 1, wherein the specified display area is a free-form area.

8. The method according to claim 1, further comprising:
  displaying, by one or more processors, a predetermined dialog panel in response to the condition being satisfied.

9. A computer program product for displaying a copy of a specified display area on a computer display, the computer program product comprising a non-transitory computer readable storage medium having program code embodied therewith, wherein the program code is readable and executable by a processor to perform a method comprising:
  receiving a first signal from a user, wherein the first signal specifies a display area on a display as a specified display area, and wherein the specified display area presents a dynamic activity being performed on a computer;
  receiving a second signal from the user that identifies a particular object in the specified display area;
  generating a copy of the specified display area that includes only the particular object, wherein the copy of the specified display area has a same shape as the specified display area, wherein the copy of the specified display area presents the dynamic activity being performed on the computer, and wherein the copy of the specified display area that includes only the particular object is visible on the display while the specified display area is obscured on the display;
  setting a condition for display of the copy of the specified display area in response to an instruction from a user, wherein the copy of the specified display area on the display is displayed in response to the condition being satisfied, and wherein the condition is from a group consisting of a change in a character in the specified display area, a change in an image in the specified display area, and a transmission of a message to an object in the specified display area; and
  displaying the copy of the specified display area on the display.

10. The computer program product of claim 9, wherein the method further comprises:
  receiving an instruction from the user to move and resize the copy of the specified display area; and
  in response to receiving the instruction from the user to move and resize the copy of the specified display are, moving and resizing the copy of the specified display area on the display.

11. The computer program product of claim 9, wherein the particular object is a window.

12. The computer program product of claim 9, wherein the particular object is an icon.

13. The computer program product of claim 9, wherein the second signal identifying the particular object identifies a plurality of objects.

14. The computer program product of claim 9, wherein the specified display area is a rectangular area.

15. The computer program product of claim 9, wherein the specified display area is a free-form area.

16. The computer program product of claim 9, wherein the method further comprises:
  displaying a predetermined dialog panel in response to the condition being satisfied.

17. A computer system comprising:
  one or more processors,
  one or more computer readable memories communicably coupled to the one or more processors, and
  program instructions stored on at least one of the one or more computer readable memories for execution by at least one of the one or more processors via at least one of the one or more computer readable memories, the stored program instructions comprising:
  program instructions to receive a first signal from a user, wherein the first signal specifies a display area on a display as a specified display area, and wherein the specified display area presents a dynamic activity being performed on a computer;

program instructions to receive a second signal from the user that identifies a particular object in the specified display area;

program instructions to generate a copy of the specified display area that includes only the particular object, wherein the copy of the specified display area has a same shape as the specified display area, wherein the copy of the specified display area presents the dynamic activity being performed on the computer, and wherein the copy of the specified display area that includes only the particular object is visible on the display while the specified display area is obscured on the display;

program instructions to set a condition for display of the copy of the specified display area in response to an instruction from a user, wherein the copy of the specified display area on the display is displayed in response to the condition being satisfied, and wherein the condition is from a group consisting of a change in a character in the specified display area, a change in an image in the specified display area, and a transmission of a message to an object in the specified display area; and program instructions to display the copy of the specified display area on the display.

\* \* \* \* \*